May 15, 1962 P. G. PATER 3,034,389
ADJUSTABLE HYDRAULIC CLAMP FOR SQUARING SHEARS
Filed May 5, 1958 2 Sheets-Sheet 1
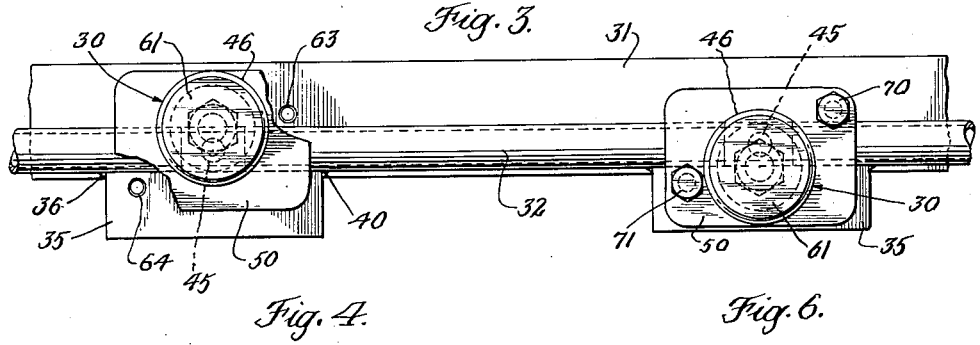
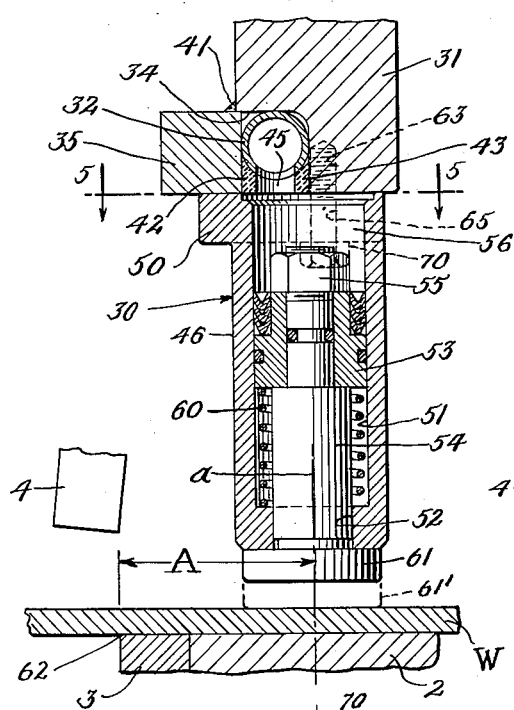
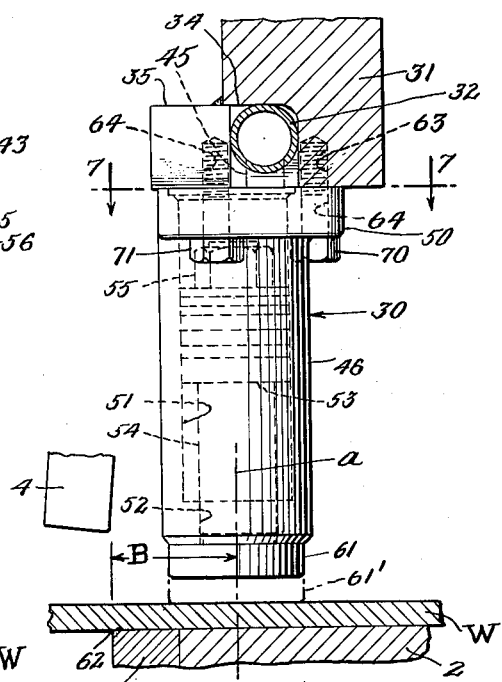
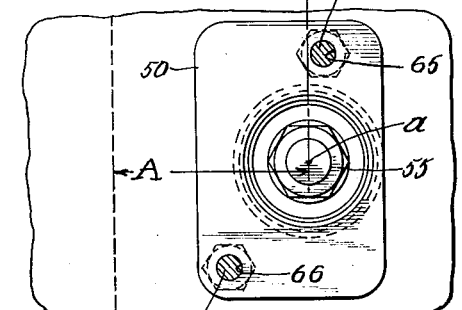
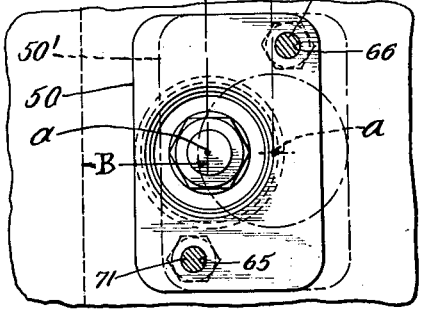
INVENTOR
Paul G. Pater
BY
Synnestvedt & Lechner
ATTORNEYS May 15, 1962    P. G. PATER    3,034,389
ADJUSTABLE HYDRAULIC CLAMP FOR SQUARING SHEARS
Filed May 5, 1958    2 Sheets-Sheet 2
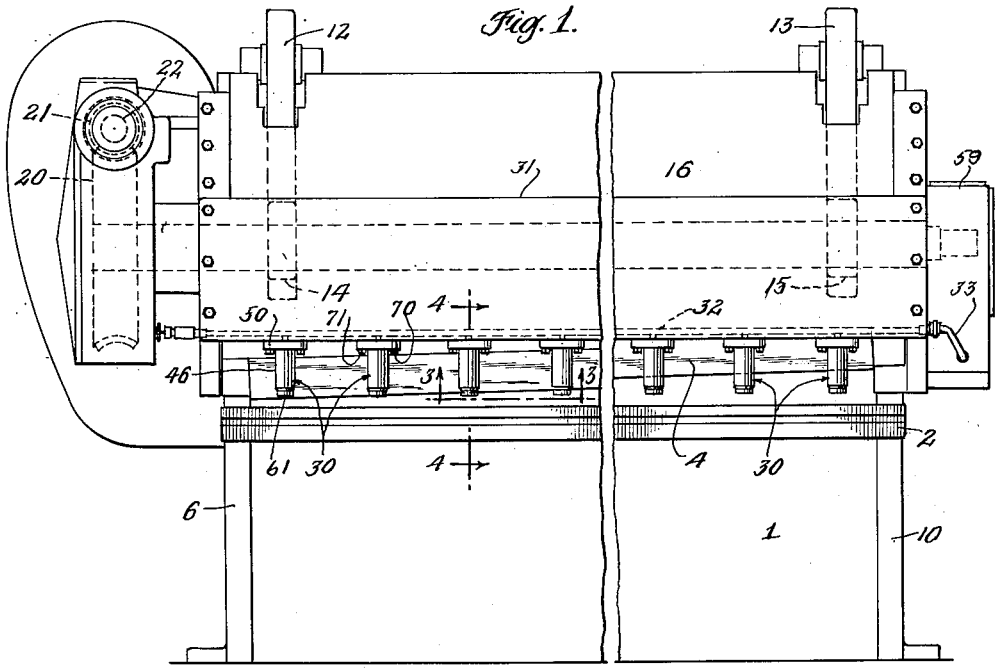
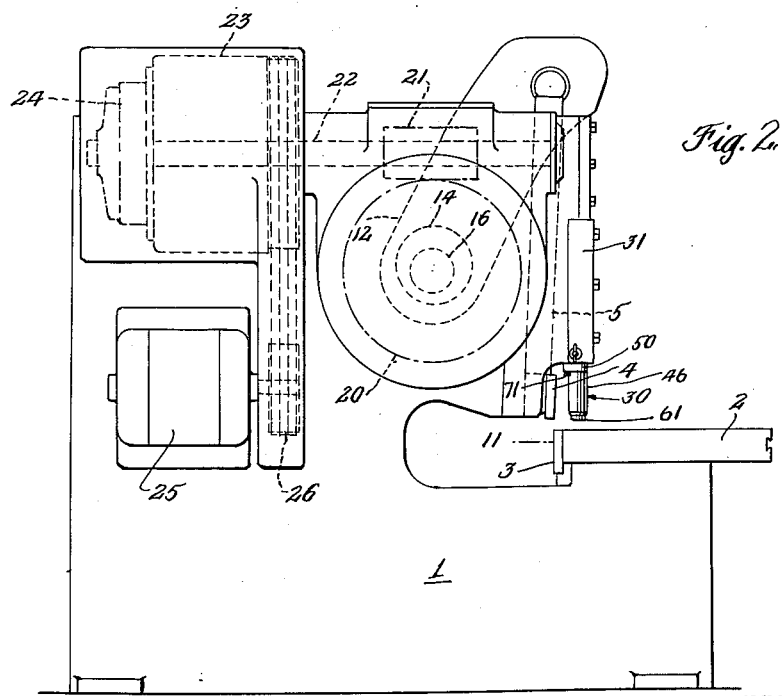
INVENTOR
Paul G. Pater
BY
Synnestvedt & Lechner
ATTORNEYS United States Patent Office 3,034,389
Patented May 15, 1962

3,034,389
ADJUSTABLE HYDRAULIC CLAMP FOR
SQUARING SHEARS
Paul G. Pater, Fairfield, Ohio, assignor to The Lodge &
Shipley Company, Cincinnati, Ohio, a corporation of
Ohio
Filed May 5, 1958, Ser. No. 733,138
3 Claims. (Cl. 83—461)

This invention relates to machine tools and particularly to squaring shears having improved hold-down or clamping devices for holding a work piece during a shearing operation.

The ordinary type of shearing machine includes a pair of elongated blades mounted one above the other with the lower blade being fixed to a work table supporting the piece to be sheared and with the upper blade being mounted so as to be movable downwardly past the lower blade. The disposition of the blades relative to each other can be adjusted so that as the upper blade moves downwardly past the lower blade during the shearing operation there is a clearance between the cutting edges of the blades, the amount of clearance depending generally upon the kind and thickness of the material to be sheared. With this arrangement the cutting edge of the lower blade acts in the nature of a fulcrum around which the work piece tends to rotate by virtue of the force being exerted by the upper blade at a finite distance or moment arm from the fulcrum. Furthermore, the shearing forces tend to cause the work piece to move or slide on the table. These reactions necessitate the use of means for clamping the work piece on the table which commonly comprise a plurality of fluid actuated fingers which are capable of exerting the necessary force.

I have found that the use of the ordinary hold-down fingers in squaring shears presents a variety of problems, particularly where the shears are to be used for working many different types and kinds of metals having a wide range of thicknesses and a variety of widths as compared with the length of the shearing blades.

For example, the force exerted by the hold-down devices must not only be great enough to prevent the tendency of the work to rotate, but also be great enough to prevent the work from sliding, moving or twisting on the table. While the hold-down force may be applied at a maximum distance from the cutting edge so as to obtain a greater moment arm, such disposition is not conducive to minimum stock waste and with certain types and thicknesses of metals there may be a tendency for the metal between the cutting edge and the finger to buckle and thus prevent a clean shear. Another problem arises where the width of the sheet or plate to be sheared is only a portion of the length of the blades. Here the net available force area of the clamping means is proportionately less, yet the force of the shearing operation tending to rotate or slide the piece is almost as great as that exerted where the stock is full length. Another problem arises in situations where the stock is so narrow that only a single hold-down finger can be used. In this instance the shearing pressure on the work piece is nearly as great as that exerted on a much wider piece of stock of the same thickness. The fact of the availability of only one hold-down finger presents a dangerous condition in that the stock being sheared can be violently twisted or kicked up with consequent likelihood of injury to the operator or machine.

With the above in mind then, the principal object of the invention is to provide a shearing machine wherein the work hold-down means can be quickly and easily coordinated with the type and kind and with the thickness and width of the work to be sheared so as to obtain the objectives of adequate clamping force, a clean shear and minimum waste. The invention contemplates that the means clamping the work piece on the table during the shearing operation be arranged so that the force exerted thereby can be applied at variable distances from the cutting edge of the lower blade. In the specific embodiment shown herein, a plurality of hold-down fingers are arranged so that each finger can be mounted at different positions or distances from the cutting edge whereby the force exerted will be spaced from the cutting edge in accordance with the adjusted position. Each finger may be adjusted to a distance closer to or farther from the cutting edge than the fixed distance of the conventional hold-down finger.

With the adjustable feature a wide combination of finger distances from the cutting edge are possible, for example, all of the fingers may be set to the minimum or maximum distance or a staggered effect may be obtained where one finger is located at a maximum and the next adjacent finger a minimum distance and the next finger a maximum distance and so on. This makes for a highly flexible and versatile machine. Thus with thick steel plates, the fingers may be staggered to hold the plate against buckling and the tendency to rotate or slip. Or where the width of the work piece is somewhat less than the blade length or so narrow that only one or two fingers can be used, the fingers may be set as a maximum distance so as to obtain greater net force. In certain other instances where the metal is of the kind and thickness that will permit, the hold-down fingers can be adjusted to a minimum distance from the cutting edge thereby increasing the ability of the machine to shear with a minimum of waste yet be adaptable for those instances where extraordinary hold-down force is required.

The manner in which the preferred embodiment of the invention is constructed and certain advantages and features will be apparent from the following description and drawings wherein:

FIGURE 1 is a front elevation partially broken out of an improved shearing machine of the invention;

FIGURE 2 is an end elevation looking to the right in FIGURE 1;

FIGURE 3 is an enlarged view looking upward as indicated by the line 3—3 of FIGURE 1 illustrating one of the hold-down devices (left-hand side) adjusted to a maximum distance from the cutting edge of the lower shearing blade and the hold-down device on the right-hand side being shown in its adjusted position at a minimum distance from the cutting edge of the shearing blade;

FIGURE 4 is an enlarged cross-section of a hold-down device as taken on the line 4—4 of FIGURE 1 and illustrating the device in its adjusted position at a maximum distance from the cutting edge of the lower shearing blade;

FIGURE 5 is a plan section taken on the line 5—5 of FIGURE 4;

FIGURE 6 is a view of the holding device of FIGURE 4 partly in section and adjusted to a position at a minimum distance from the cutting edge of the lower shearing blade; and FIGURE 7 is a plan section taken on the line 7—7 of FIGURE 6.

In FIGURES 1 and 2 I have shown the general arrangement of a shearing machine which is in conventional form except for the hold-down device of the present invention. Shearing machines of this general type are well known in the art and the various parts and components need not be referred to in detail as their structure and function are well understood.

The frame of the shearing machine is designated by 1 and a table 2 is mounted on the front part of the machine, the table being adapted to support a work piece or stock to be sheared. The table is elongated and extends substantially the full width of the machine. Along the inner edge of the table is mounted the lower shearing blade 3. The upper shearing blade is designated by 4, supported on the ram 5. As best seen in FIGURE 1 the upper blade is angled in the usual manner with respect to the horizontal table 2. The ram 5 is mounted in slides provided in side plates 6 and 10 for reciprocating vertical motion. In FIGURE 2 the blade and ram are in the uppermost position and the lowermost position of the same is indicated substantially at the position indicated by the dotted lines 11. The reciprocating motion of the ram is provided by a pair of pitmans 12 and 13 which are mounted by eccentrics 14 and 15 disposed on rotating shaft 16. The shaft 16 is adapted to be rotated by worm wheel 20 connected to a worm 21 mounted on a shaft 22 which is adapted to be connected or disconnected to a flywheel 23 by means of the clutch brake device 24, the flywheel being driven by the motor 25 through the pulley and belt arrangement designated by 26.

The hold-down devices of the invention are designated by 30 in FIGURES 1 and 2, all of these devices being mounted on the front plate 31. It will be seen in general that these devices are disposed over the work table 2 and extend adjacent to and at intervals along the full length of the lower shearing blade 3. The hold-down devices are preferably of the fluid pressure type being supplied by hydraulic fluid from a manifold 32 mounted in the lower part of the front plate 31. The manifold is supplied with fluid from a line 33 connected to pumping mechanism not shown. Preferably, each of the hold-down devices is identical in construction. The construction of the hold-down devices and the manner of mounting the same will next be described.

As best indicated in FIGURES 3 and 4 the lower end of the front plate 31 is formed with a cut-out section 34 in which is disposed a pipe or fluid-carrying tube which forms the manifold 32. At spaced positions along the lower edge of the front plate 31 are blocks 35 which are welded to the plate by the welds 36, 40 and 41. The manifold or tube 32 is disposed in the slot 34 and is held therein by means of welding shown at 42 and 43. The tube is apertured and a registering aperture in this welding provides fluid conduit 45 between the manifold and the hold-down device.

Each hold-down device comprises a cylinder 46 having an enlarged head 50 and stepped bores 51 and 52. Within the cylinder is mounted a piston 53 mounting a hold-down finger 54 as by the nut 55. The upper space in the bore 51 forms a chamber 56 which is in communication with the conduit 45. In the lower part of the bore 51 is mounted a spring 60 which normally urges the piston and finger upwardly so that the enlarged lower end or pad 61 of the finger is tight against the lower end of the cylinder. As will be apparent, fluid in the manifold 32 flowing through the conduit 45 into the chamber 56 will react on the piston and cause the same to move the finger downwardly against the force of the spring.

In FIGURE 4 a work piece designated by W is mounted on the table 2 and extends over the cutting edge 62 of the lower blade. When the unit pressure in the manifold 32 is increased, the force of the fluid causes the finger to move downwardly so that the pad 61 contacts the work piece W as indicated by the dotted lines 61' and exerts a clamping force. The control for the unit pressure in the manifold 32 may be conventional, for example, a plunger-type pump located in the housing 59 (FIG. 1) whose action is coordinated with the rotation of the shaft 16.

In FIGURES 4 and 5 the hold-down finger is located at its maximum position from the cutting edge 62 or as represented by the arrows A extending between the cutting edge and the axis $a$ of the finger. With this adjustable feature, it will be apparent that the point of clamping force exerted by a finger on a work piece can be variably spaced from the cutting edge. The preferred manner of arranging the finger so as to be adjustable to different distances from the cutting edge is explained following.

With reference to FIGURE 3 it will be seen that the lower end of the plate 31 and the block 35 are respectively provided with threaded holes 63 and 64. As best seen in FIGURE 5 the head 50 has holes 65 and 66. The hole 63 is aligned with the hole 65 and the hole 64 is aligned with the hole 66. The screw 70 is disposed in the holes 63 and 65 and the screw 71 in holes 64 and 66. The screws hold the device secure. From an inspection of FIGURE 5, it will be apparent that a plane containing the axes of the holes 63 and 65 and 64 and 66 is parallel to but spaced from the axis $a$ of the finger. With this arrangement it will be noted that if the screws 70 and 71 are removed and the hold-down device reversed 180° in position (FIG. 7), holes 65 and 66 in the head 50 will be respectively aligned with the holes 64 and 63 so that the axis $a$ of the finger is moved from the maximum position of FIGURE 5 to the minimum position as indicated by arrow B.

The difference in the two positions is clearly illustrated in FIGURE 7 where the dot and dash line 50' represents the position of the head in FIGURE 5 and the full line 50 shows the new position of the head. The space between the two positions is indicated by the arrow C. In the new position of adjustment, the hold-down device is again held on the plate 31 by the screws 70 and 71. Further it will be observed from an inspection of FIGURES 4 and 6 that the manifold 32, conduit 45 and cylinder 46 are cooperatively arranged so that in either adjusted position fluid can enter and exit from the chamber 56.

I claim:

1. In shearing apparatus:
    a frame;
    a first, elongated shearing blade connected with said frame and having a cutting edge;
    a second, elongated shearing blade connected with said frame;
    means connected with said frame and with said blades and providing for relative motion of the blades toward and away from one another;
    support means for positioning a work piece so that a portion of the same extends over said cutting edge to be engaged between said blades for a shearing operation;
    a plurality of clamping devices spaced from one another in a direction along said cutting edge for clamping a work piece in position on said support means for said cutting operation;
    for each device, mechanism mounting the device over said support means and providing for the device to be adjustable toward and away from said cutting edge to any of a plurality of positions and in each position the device being differently spaced from said cutting edge, the mechanism including means mounting the device to provide for movement of the device toward and away from said support means, movement of the device toward the support means being for engaging and exerting a clamping force on a work piece on the support means; and
    for each device, means operative when the device is in any said adjusted position for moving the device toward and away from said support means.

2. In shearing apparatus:
    a frame;
    a first, elongated shearing blade connected with said frame and having a cutting edge;
    a second, elongated shearing blade connected with said frame and mounted for movement toward and away from first said blade;

a table connected with said frame and mounting said first blade and having a supporting surface for supporting a work piece so that a portion of the work piece extends over said cutting edge to be engaged between said blades for a shearing operation;

a plurality of hold-down fingers spaced from one another in a direction along said cutting edge for clamping a work piece in position on said table for said shearing operation;

for each finger, mechanism mounting the finger on said frame and providing for the finger to be adjustable toward and away from said cutting edge to any of a plurality of positions and in each position the finger being differently spaced from said cutting edge, the mechanism including means mounting the finger to provide for movement of the finger toward and away from said table, movement toward the table being for engaging and exerting a clamping force on a work piece on the table; and for each finger, means operative when the finger is in any said adjusted position for moving the finger toward and away from said table.

3. In a shearing apparatus, the subcombination comprising:

a flat, elongated table having a supporting surface to support a work piece to be sheared;

an elongated shearing blade having a cutting edge fixed to and extending along one of the long edges of said table;

an elongated support disposed over said table and extending in the same direction as said blade;

a fluid pressure manifold extending along the bottom of said support;

a plurality of cylinders disposed over said table and spaced from one another in a direction along said cutting edge, each cylinder including a piston having a hold-down finger secured thereto;

for each cylinder, means mounting the cylinder on said support including mechanism providing for the cylinder to be adjustable relative to the support in a direction generally parallel said surface toward and away from said cutting edge to any of a plurality of positions and in each position the finger being differently spaced from the cutting edge; and for each cylinder, means forming a fluid conducting connection between said manifold and the cylinder while the cylinder is in any said adjusted position and the piston being movable in its cylinder in a direction generally normal said surface while the cylinder is in any said adjusted position.

References Cited in the file of this patent

UNITED STATES PATENTS

| | | |
|---|---|---|
| 773,810 | Rau | Nov. 1, 1904 |
| 1,885,438 | Hazelton | Nov. 1, 1932 |
| 2,105,402 | Brownlee | Jan. 11, 1938 |
| 2,314,645 | Duda | Mar. 23, 1943 |
| 2,766,825 | Pater | Oct. 16, 1956 |
| 2,833,349 | Green | May 6, 1958 |

FOREIGN PATENTS

| | | |
|---|---|---|
| 358,864 | Great Britain | Oct. 15, 1931 |